United States Patent Office 3,374,286
Patented Mar. 19, 1968

3,374,286
POLYMERIC POLYHYDROXY - POLYETHER
RESINS AND METHOD OF MAKING SAME
Darrell D. Hicks, Louisville, Ky., assignor to Celanese
Coatings Company, New York, N.Y., a corporation of
Delaware
No Drawing. Continuation-in-part of application Ser. No.
281,337, May 17, 1963. This application Feb. 1, 1967,
Ser. No. 613,123
9 Claims. (Cl. 260—834)

ABSTRACT OF THE DISCLOSURE

A process for preparing fusible polymeric polyhydroxy polyether resins by reacting a diepoxide resin, a monohydric alcohol and a monoepoxide in the ratio of 1 mol of diepoxide resin with about one mol of alcohol and less than ten mols of monoepoxide.

Cross-reference to related applications

This is a continuation-in-part of my copending application, Ser. No. 281,337, filed May 17, 1963.

Background of the invention

With new fields of use for polymeric coating composition creating additional markets, increased demands for specialized polymers have resulted. Where one polymeric composition is desirable for one use, another polymeric substance may be better for some other purpose. As a consequence, a variety of parallel polymeric compositions are being developed when a certain type of polymeric material shows particular promise.

One such type of polymer is the polymeric polyhydroxy resin. Polymeric polyhydroxy resins are especially useful in the coatings industry because they can be used in combination with many materials which react with hydroxyl groups. Particularly useful compositions result from the reaction of polymeric polyhydroxy resins with such cross-linking agents as aminoplast resins, phenolplast resins, polyisocyanates, polyanhydrides, and the like.

In my copending application Ser. No. 281,354, filed May 17, 1963, it was found that desirable polyhydroxy-polyether polymers can be made from epoxide resins and monohydric alcohols without gelation using less than one mol of alcohol per epoxy equivalent. It has now been found that these polymeric polyhydroxy-polyether resins can be modified by the inclusion of a monoepoxide in the polymerization mixture. When a monoepoxide is mixed with the epoxide resin and the monohydric alcohol, the monoepoxide will copolymerize with the epoxide resin and alcohol and be incorporated into the polymer chain. Incorporation of such structures in the polymer imparts modifications to the resins in such properties as solubility, and melting point. The flexibility and hardness of these polymeric polyhydroxy-polyethers when cured can also be altered by such modifications.

Description of the invention

In preparing the polymeric polyhydroxy-polyethers of this invention, the alcohol, epoxide resin and monoepoxide will generally be employed in a ratio of about one-half mol of monohydric alcohol to one equivalent epoxide resin to less than five mols of monoepoxide. One mol of a diepoxide resin contains about two epoxide equivalents. Hence, in terms of mols, the range is 1 to 1.4 mols of monohydric alcohol per mol of epoxide resin. This can be used in combination with from less than one-half mol to as high as ten mols of monoepoxide. The preferred range, however, is 0.5 to 5 mols of monoepoxide with one equivalent epoxide resin and 0.5 to 0.7 mol of monohydric alcohol.

Monoepoxides contemplated for use in this reaction are such compounds as ethylene oxide, propylene oxide, 1,2 and 2,3 butylene oxide, styrene oxide, limonene monoxide, butyl glycidyl ether, phenyl glycidyl ether, glycidyl acetate, glycidyl methacrylate and the like. In these compounds, the only reactive group is the epoxide group. In addition, monoepoxides can be utilized in this invention which contain a hydroxyl group. Such monoepoxides are glycidol, monoglycidyl ether of ethylene glycol, monoglycidyl ether of butanediol and the like. Other desirable monoepoxides containing hydroxyl groups are the mono (hydroxyaliphatic), monoglycidyl diethers of dihydric phenols.

In carrying out the process of this invention, a monohydric alcohol, an epoxide resin and a monoepoxide compound are reacted in the presence of a catalyst to produce a polyhydroxy-polyether resin. When a monohydric alcohol reacts with an epoxide resin, an intermediate product results which contains an alcoholic hydroxyl group and an epoxide group. A monoepoxide molecule can react with the formed hydroxyl of the intermediate or with a monohydric alcohol. When an epoxide group reacts with one of the formed hydroxyls in the polymer chain, branching of the polymer results. In any event, the polymerization proceeds through the reaction of the epoxide groups with the hydroxyl groups. As the reaction progresses, the epoxide content decreases but the hydroxyl content remains constant. The resulting polyhydroxy-polyether resin is a heterogeneous polymerized product wherein the monohydric alcohol, the epoxide resin and the monoepoxide compound are interreacted in random order in the polymer chain.

The epoxide resins with which this invention is concerned are those compounds which contain no more than two 1,2 epoxide groups. Such compounds are glycidyl polyethers of dihydric phenols which are made from the reaction of a dihydric phenol with epichlorohydrin or glycerol dichlorohydrin, and a sufficient amount of a caustic alkali to combine with the chlorine of the chlorohydrin. Such products are monomeric or straight chain polymeric products characterized by the presence of more than one and up to two three-membered epoxide groups. Dihydric phenols which can be used for this purpose include p,p'-dihydroxydiphenyl dimethyl methane (Bisphenol A), resorcinol, hydroquinone, bis(4-hydroxyphenyl) ethane and 1,5-dihydroxynaphthalene. In preparing these glycidyl polyethers, the proportion of the chlorohydrin to dihydric phenol is in the molar ratio of at least 1.2 to 10 mols of epichlorohydrin to 1 mol of dihydric phenol.

Other epoxides applicable to this invention are the diglycidyl ethers of dihydric alcohols, such as the diglycidyl ether of ethylene glycol and butanediol.

In addition to glycidyl ethers, diepoxides made by the peracid methods are also suitable. Epoxides are readily prepared by reacting unsaturated esters, polyesters, diolefins and the like with a peracid.

The monohydric alcohols which can be used in the process of this invention are primary and secondary alcohols containing up to as high as 24 carbon atoms and having no groups other than their hydroxyl groups reactive with epoxide groups. Such alcohols include not only the hydrocarbon alcohols but also monohydroxy ethers and monohydroxy esters. Among the primary alcohols which are contemplated in this invention are methyl alcohol, ethyl alcohol, n-propyl alcohol, n-butyl alcohol, n-amyl alcohol, 2-ethylhexyl alcohol, benzyl alcohol, allyl alcohol, linoeyl alcohol, hydroxyethyl phenol, hydroxyethyl methacrylate, methyl Cellosolve, butyl Cellosolve, methyl Carbitol, butyl Carbitol, and the like. Secondary alcohols include isopropyl alcohol, s-butyl alcohol, 2-hydroxypropyl cresol, 1 - butoxyethoxy-2-propanol, 2,6-dimethyl - 4-heptanol, 2-hydroxypropyl acrylate, 7-ethyl-2-methyl - 4 - undecanol, and the like. Although alcohols that contain as high as 24 carbon atoms in their molecular structure are contemplated in this reaction, the preferred alcohols are those alcohols which contain no more than 10 carbon atoms. Polymeric hydroxyethers, that result from using the lower alcohols, cure to much harder, more mar resistant and stronger films than the polyhydroxy-polyethers that are prepared using higher alcohols. The polyhydroxy-polyether resins, prepared using drying oil derived alcohols, such as linoleyl alcohol, having found utility in the air-drying film field.

The preferred condensation catalysts for this reaction are the Lewis acids. Such catalysts are $BF_3$ and $BF_3$ complexes, for example the $BF_3$ ether complex as well as $AlCl_3$, $SnCl_4$, $TiCl_4$, etc. Other acids, for instance sulfuric acid, can also be used. The preferred catalyst is $BF_3$, preferably the $BF_3$ etherate.

The polymerization is generally conducted in a solvent due to the high melting point of the resinous product and the exothermic nature of the reaction. Any solvent which is, of course, a solvent for the reactants and for the reaction product and which contains no groups reactive with epoxide groups can be used in the operation of this invention. Such solvents include aromatic hydrocarbons, ketones, ethers and esters. In carrying out this invention in polar solvents, the process is operable over the whole range of reactants, that is, the monohydric alcohol and the epoxide resin can be reacted in a mol ratio as low as one to one along with 0.5 to 5 or even 10 mols of monoepoxide. The resulting soluble and fusible polyhydroxy-polyether resins are produced in good conversion. Similar results are obtained when a portion of the polar solvent is replaced by a more inexpensive nonpolar solvent. However, when a predominant amount of nonpolar solvent or all nonpolar solvent is used, the range of operable ratios of reactants is somewhat limited. The preferred lower ratios of reactants in these instances are about 1.4 mols of monohydric alcohol to 1 mol of epoxide resin. When lower ratios are used, gelation or incomplete reaction can occur. With the consideration given herein, such modifications of reactant ratios can be readily determined by one skilled in the art.

Solvents which can be used in this process are benzene, toluene, xylene, methylethyl ketone, methylisobutyl ketone, Cellosolve acetate, diethyl Carbitol and the like.

The condensation of these monohydric alcohols and diepoxide compounds can be conducted at temperatures of 20° C. to 150° C. or even up to 200° C. The upper temperature limit will, of course, be governed by the boiling point of the solvent and of the reactants used in the system. The preferred temperature range is 60° C. to 120° C. When temperatures below 60° C. are used, the rate of reaction is slow and long process times are required. When temperatures above 120° C. are used, side reactions occur with resulting darkening of the reaction product.

This invention will be further illustrated by the following specific examples, but it will be understood that the invention is not limited thereto. The "parts" used in these examples is understood to be "parts by weight." The epoxide resin used in these examples is the product of the reaction of 1 mol of p,p'-dihydroxydiphenyl dimethyl methane (Bisphenol A), 10 mols of epichlorohydrin, and 2 mols of sodium hydroxide. The resin has an epoxide equivalent weight of 190 and for the purposes of this invention, a molecular weight of 380.

*Example 1*

To a one-liter flask equipped with stirrer, thermometer, reflux condenser and addition tube are added 53.4 parts of benzyl alcohol, 50 parts of methyl isobutyl ketone and 2 parts of $BF_3$ etherate. Heat and stirring are applied. When the temperature reaches 65° C., addition of 94.5 parts of diepoxide resin in 50 parts of methyl isobutyl ketone is begun. The addition is complete in 36 minutes with the temperature being held between 62° C. and 65° C. 57.6 parts of propylene oxide are then added over a twenty-minute period while holding the temperature between 62° C. and 67° C. A solution of 94.2 parts of diepoxide resin in 100 parts of methyl isobutyl ketone is then added over a fifty-two minute period while holding the temperature in the same range as during the previous additions. The temperature is then gradually raised to 120° C. over a three-hour and fifteen-minute period. The catalyst is deactivated by the addition of 20 parts of cation exchange resin and by heating the mixture for one hour at 100° C. The solution is then filtered.

This solution has a Gardner-Holdt viscosity at 25° C. of T–U at 60 percent solids. The conversion to polymer is 98.9 percent.

This polymer is the reaction product of 1 mol of benzyl alcohol, 1 mol of diepoxide resin and 2 mols of propylene oxide.

Films prepared from this solution and 20 percent on a solids basis of a butylated urea-formaldehyde resin and 0.4 weight percent of the morpholine salt of butyl acid phosphate are well cured after a thirty-minute bake at 150° C. These films show no damage after four weeks immersion in 5 percent NaOH solution and exhibit excellent resistance to boiling water. The films have good gloss, flexibility and impact resistance.

Films are also prepared from the resin solution and 20 percent on a solids basis of an isobutylated melamine-formaldehyde resin with 0.4 weight percent of the morpholine salt of butyl acid phosphate. These films are well cured after a thirty-minute bake at 150° C. The films exhibit excellent mar resistance, high gloss, flexibility and toughness.

*Example 2*

Using the same procedure as described in Example 1, ethylene glycol monophenyl ether, diepoxide resin and propylene oxide are reacted on a 1 to 1 to 2 molar basis in methyl isobutyl ketone solvent, using $BF_3$ etherate catalyst.

The polymer solution has a Gardner-Holdt viscosity at 25° C. of L at 59.4 percent solids.

Films prepared from a blend of this polymer solution with 25 percent on a solids basis of butylated urea-formaldehyde resin and 0.4 weight percent of the morpholine salt of butyl acid phosphate, are well cured after a thirty-minute bake at 150° C. These films show excellent resistance to boiling water and to 5 percent caustic solution and exhibit good gloss and flexibility.

*Example 3*

Butyl alcohol, diepoxide resin, and propylene oxide are reacted in xylene as described in Example 1, in a 1.3 to 1 to 2 molar ratio. The polymer solution has a viscosity (Gardner-Holdt at 25° C.) of G at 49.1 percent solids.

Blends of this polymer solution are made with 30 percent butylated urea-formaldehyde resin solution on a solids basis and 0.4 weight percent of the morpholine salt of butyl acid phosphate. Films prepared on electrolytic tin plate and glass are cured at 150° C. for thirty minutes. These well cured flexible films have excellent resistance to 5 percent NaOH solution and boiling water.

*Example 4*

To a one-liter flask equipped with stirrer, condenser, thermometer and inlet tube are added 84 parts of ethylene glycol phenyl ether, 100 parts of xylene and 2 parts of $BF_3$ etherate. Heat is applied and at 65° C., slow addition of 165.6 parts of diepoxide resin in 100 parts of xylene is begun. The solution is added over a one-hour period holding the temperature between 64° C. and 66° C. 50.4 parts of propylene oxide is then added in 17 minutes. The temperature is then raised to 120° C. and held at 120° C. for one hour. The catalyst is deactivated by adding 20 parts of cation exchange resin to the resin solution and by heating at 80° C. for one hour. The cation exchange resin is then removed by filtration.

The resin solution has a Gardner-Holdt viscosity at 25° C. of P–Q at 58 percent solids in xylene, and the conversion to polymer is 97.5 percent.

The polymer is the reaction product of 1.0 mol diepoxide resin, 1.4 mols of ethylene glycol phenyl ether, and 2.0 mols of propylene oxide.

Films are prepared from this polymer solution and 25 percent on a solids basis of butylated urea-formaldehyde resin with 0.4 weight percent of the morpholine salt of butyl acid phosphate on glass and electrolytic tin plate. The films are cured by baking at 150° C. for 30 minutes. The cured films have excellent mar resistance and flexibility, and exhibit no damage after 4 weeks in 5 percent caustic water.

Example 5

Using the same equipment and procedure as described in the preceding examples, 1 mol of diepoxide resin is reacted with 1 mol of n-butyl alcohol and 1 mol of phenyl glycidyl ether using $BF_3$ etherate catalyst and methyl isobutyl ketone. The polymeric product has a Gardner-Holdt viscosity at 25° C. of T at 60 percent solids in methyl isobutyl ketone.

Example 6

Using the same equipment and procedure as described in the preceding examples, 1 mol of diepoxide resin is reacted with 1 mol of n-butyl alcohol and 3 mols of phenyl glycidyl ether using $BF_3$ etherate catalyst and 50/50 methyl isobutyl ketone-xylene solvent mixture. The product has a Gardner-Holdt viscosity at 25° C. of T at 60 percent solids in the above solvent mixture.

Films are prepared from the polymer solutions of Example 5 and Example 6 using 20 percent and 30 percent butylated urea-formaldehyde resin on a solids basis with 0.4 weight percent of the morpholine salt of butyl acid phosphate and are baked at 150° C. for 30 minutes. Soft flexible films result.

The products which result from the copolymerization process of this invention are essentially high molecular weight polyhydric alcohols. These products are valuable compositions due to the presence of the hydroxyl groups which are reactive with many materials. Reactive materials are anhydrides, such as phthalic anhydride or maleic anhydride, or acids such as lauric or palmitic. Particularly valuable products are obtained by reacting these high molecular weight polyhydric alcohols with unsaturated acids derived from drying oils. Such esterified products are useful in preparing air-drying and baking varnishes and enamels for use as protective coatings for wood, metal and other substances. Protective coatings are also prepared by reacting these polymeric polyhydric alcohols with cross-linking agents as hereinbefore described. These cross-linking agents can be polyisocyanates, such as tolylene diisocyanate, hexamethylene diisocyanate, diphenyl methane diisocyanate, etc., which are used in the range of 0.5 to 1.2 isocyanate groups per 1 hydroxyl group; condensation products containing methylol groups and obtained from the reaction of formaldehyde with urea, melamine, benzoguanamine and phenol, which are used to make up 15 percent to 50 percent of the composition with the polyhydroxy compound; alkoxylated methylol compounds, obtained by reacting formaldehyde and a monohydric alcohol, such as methanol or butanol, with urea, melamine, acetoguanamine, phenol and the like. Polyepoxides, such as the diglycidyl ether of Bisphenol A and dicyclopentadiene dioxide, can also be used to cross-link the polyhydroxy-polyether resins of this invention.

It is to be understood that the foregoing detailed description is given merely by way of illustration and that many variations may be made therein without departing from the spirit of the invention.

The embodiments of the invention in which an exclusive property or privilege is claimed are defined as follows:

1. A process for producing a soluble, fusible, high molecular weight polyhydroxy-polyether resin which comprises reacting
   (A) a monohydric alcohol free of groups other than the hydroxyl group which are reactive with epoxide groups;
   (B) an epoxide resin containing more than one to two 1,2 epoxide groups per molecule, and
   (C) a monoepoxide which may contain one hydroxyl group, but which otherwise is free of substituents reactive with epoxide groups using a catalyst selected from the group consisting of boron trifluoride, boron trifluoride complexes, aluminum chloride, stannic chloride, titanium chloride and sulfuric acid, wherein (A) the monohydric alcohol, (B) the epoxide resin and (C) the monoepoxide are in the ratio of 0.5 to 0.7 mol of (A) to 1.0 epoxide equivalent of (B) to 0.5 to 5.0 mols of (C).

2. The process of claim 1 wherein 0.5 to 0.55 mol of monohydric alcohol are reacted with 1.0 epoxide equivalent of epoxide resin and 1 to 3 mols of monoepoxide in a solvent selected from the group consisting of ketones, ethers, esters and mixtures thereof, each being free of active hydrogen groups reactive with epoxide groups.

3. The process of claim 1 wherein the epoxide resin contains a maximum of two aliphatic hydroxyl groups per molecule.

4. The soluble, fusible, high molecular weight resin resulting from the process of claim 1.

5. The process of claim 1 wherein the monohydric alcohol is ethylene glycol phenyl ether.

6. The process of claim 1 wherein the monoepoxide is glycidol.

7. A process for producing soluble, fusible, high molecular weight polyhydroxy-polyether resins which comprises reacting the diglycidyl ether of p,p′-dihydroxydiphenyl dimethyl methane, n-butyl alcohol and propylene oxide in a ratio of one mol of the diglycidyl ether to one mol of n-butyl alcohol to two mols of propylene oxide in methyl isobutyl ketone solvent using a $BF_3$ catalyst.

8. The cured composition resulting from the reaction product of claim 7 blended with a fusible, soluble aminoplast resin.

9. The cured composition resulting from the reaction product of claim 7 blended with a polyisocyanate compound containing a plurality of unreacted isocyanate groups.

No references cited.

WILLIAM H. SHORT, *Primary Examiner.*

T. D. KERWIN, *Assistant Examiner.*